United States Patent [19]
Mukainakano et al.

[11] Patent Number: 5,198,654
[45] Date of Patent: * Mar. 30, 1993

[54] IMAGE READING APPARATUS FOR CONVERTING OPTICAL IMAGE INFORMATION INTO AN ELECTRICAL IMAGE SIGNAL

[75] Inventors: Hiroshi Mukainakano; Yukito Kawahara; Satoshi Machida, all of Tokyo, Japan

[73] Assignee: Seiko Instruments Inc., Japan

[ * ] Notice: The portion of the term of this patent subsequent to Feb. 12, 2008 has been disclaimed.

[21] Appl. No.: 666,864

[22] Filed: Mar. 8, 1991

[30] Foreign Application Priority Data

Mar. 26, 1990 [JP] Japan ................................. 2-77776

[51] Int. Cl.$^5$ .......................................... H01L 27/146
[52] U.S. Cl. ............................. 250/208.1; 358/213.29
[58] Field of Search .................. 250/208.1; 357/30 H; 358/213.11, 213.29

[56] References Cited

U.S. PATENT DOCUMENTS 4,772,958  9/1988  Suzuki et al. ..................... 358/464
4,808,822  2/1989  Manning et al. ................... 250/332
4,992,653  2/1991  Kawahara et al. ............... 250/208.1

FOREIGN PATENT DOCUMENTS 0258861  3/1988  European Pat. Off. .
0260956  3/1988  European Pat. Off. .

OTHER PUBLICATIONS

Patent Abstracts of Japan, vol. 9, No. 4 (E-288) (1727), Jan. 10, 1985.
Patent Abstracts of Japan, vol. 12, No. 9, (E-572) Jan. 12, 1988.

Primary Examiner—Constantine Hannaher
Attorney, Agent, or Firm—Bruce L. Adams; Van C. Wilks

[57] ABSTRACT

The image reading apparatus is of the multi-chip line sensor having a plurality of photoelectric conversion elements connected through corresponding switching elements commonly to every one another. Each group of the commonly connected photoelectric conversion elements outputs on a common line an image signal which is then fed to a sample hold circuit and is thereafter outputted from a single output terminal. By such construction, the image signal from the photoelectric conversion elements is sequentially outputted externally from the single output terminal in the form of output waveshape as held in the sample hold circuit in such manner as to prolong output duration of each bit image signal to thereby enable fast operation of the line sensor.

10 Claims, 4 Drawing Sheets

IMAGE READING APPARATUS FOR CONVERTING OPTICAL IMAGE INFORMATION INTO AN ELECTRICAL IMAGE SIGNAL

BACKGROUND OF THE INVENTION

The present invention relates to an image reading apparatus for converting optical image information into an electric signal, and more specifically relates to a line sensor of the multi-chip type comprised of photoelectric conversion elements and a scanning circuit, which are arranged linearly and integrally.

FIG. 3 shows the conventional image reading apparatus constructed such that photoelectric conversion elements $1_1$-$1_n$ are connected to a common line 4 through a plurality of first switching elements $2_1$-$2_n$, respectively. An image signal is sequentially outputted from an image signal output terminal 18 through a third switching element 14. FIG. 4 is a timing chart showing the operation of the FIG. 3 image reading apparatus.

However, in the conventional image reading apparatus, since a load capacitance and resistance is coupled to the common line 4, the image signal SIG produced from the respective photoelectric conversion elements $1_1$-$1_n$ rises at a certain time constant determined by the load capacitance and resistance. In view of this, when increasing a frequency of a clock pulse CK for use in driving the image reading apparatus, the amplitude of the obtained image signal SIG decreases to thereby cause reduction of the SN ratio.

SUMMARY OF THE INVENTION

In order to solve the above noted problem, an object of the present invention is to enable fast driving of an image reading apparatus which can produce an image signal SIG from a single image output terminal.

According to the invention, as shown in FIG. 1, a plurality of photoelectric conversion elements $1_1$-$1_n$ are connected alternately through corresponding first switching elements $2_1$-$2_n$ to a pair of separate common lines 4 and 5 in an alternate manner so as to prolong a pulse duration of the image signal output. A pair of sample hold circuits 7 and 8 are connected to respective ones of the separate common lines 4 and 5. The sample hold circuits 7 and 8 are alternately and sequentially switched to enable outputting of the image signal SIG from a single image output terminal 18.

By such construction, the image reading apparatus can be driven faster than the conventional one while suppressing reduction in the SN ratio of the image signal SIG.

DETAILED DESCRIPTION OF EMBODIMENT

Figure 1:
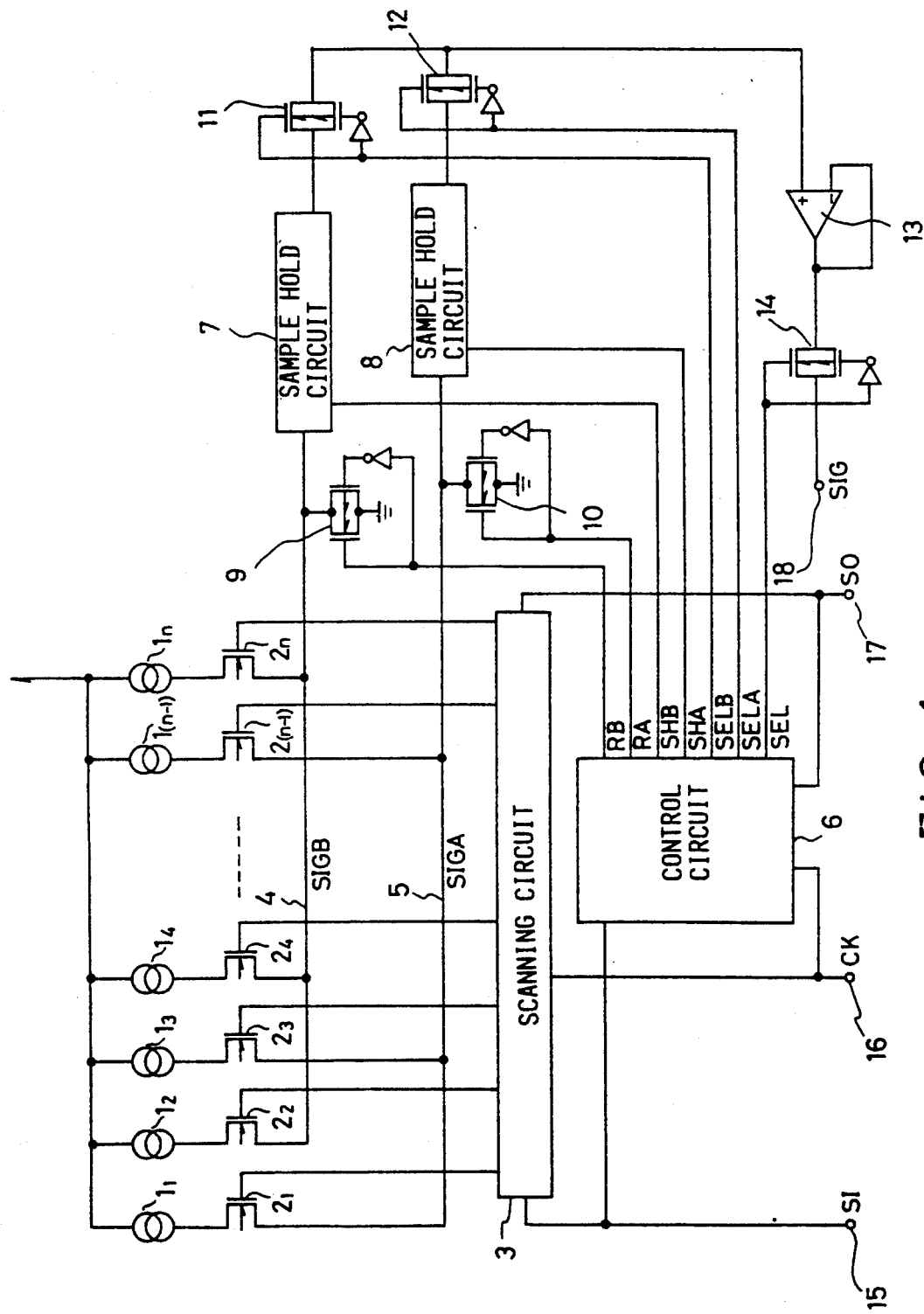
FIG. 1 is a block diagram showing the inventive image reading apparatus.

Hereinafter, an embodiment of the invention will be described in detail with reference to the drawings. FIG. 1 is a block diagram of an image reading apparatus according to the invention. A plurality of photoelectric conversion elements $1_1$-$1_n$ are connected, respectively, to a plurality of first switching elements $2_1$-$2_n$. The first switching elements $2_1$-$2_n$ are connected alternately to a pair of separate common lines 4 and 5. The first switching elements $2_1$-$2_n$ are sequentially scanned by a scanning circuit 3. The scanning circuit 3 operates when a scanning start signal SI is inputted into a scanning pulse input terminal 15 to produce scanning pulses effective to sequentially turn the first switching elements $2_1$-$2_n$ on. A control circuit 6 operates in response the scanning start signal SI and clock pulses CK for outputting a signal SHB effective to drive a sample hold circuit 7 to enable the same to temporarily hold an image signal which has been fed to the common line 4. Thereafter, the control circuit 6 outputs a signal RB effective to enable a second switching element 9 to couple the common line 4 to a ground line GND. The control circuit 6 outputs also a signal SELB effective to turn a third switching element 11 on so that the image signal held in the sample hold circuit 7 is fed to a buffer amplifier 13. By such operation, a part of the image signal is fed through the common line 4 to the buffer amplifier 13.

The remaining part of the image signal is fed through the other common line 5 to the same buffer amplifier 13 in a similar manner. Namely, the control circuit 6 outputs a signal SHA effective to drive the other sample hold circuit 8 so that the image signal on the common line 5 is temporarily held in the sample hold circuit 8. Thereafter, the control circuit 6 outputs a signal RA effective to turn another second switching element 10 on so that the common line 5 is coupled to the ground line GND. The control circuit 6 produces a signal SELA effective to turn another third switching element 12 on so that the image signal held in the sample hold circuit 8 is fed to the buffer amplifier 13. After completing the driving of all of the first switching elements $2_1$-$2_n$, the scanning circuit 3 outputs a scanning end signal SO. The control circuit 6 operates according to the start and end signals SI and SO and the clock pulses CK to produce a signal SEL effective to drive a fourth switching element 14 so as to read out the image signal from the buffer amplifier 13.

Figure 2:
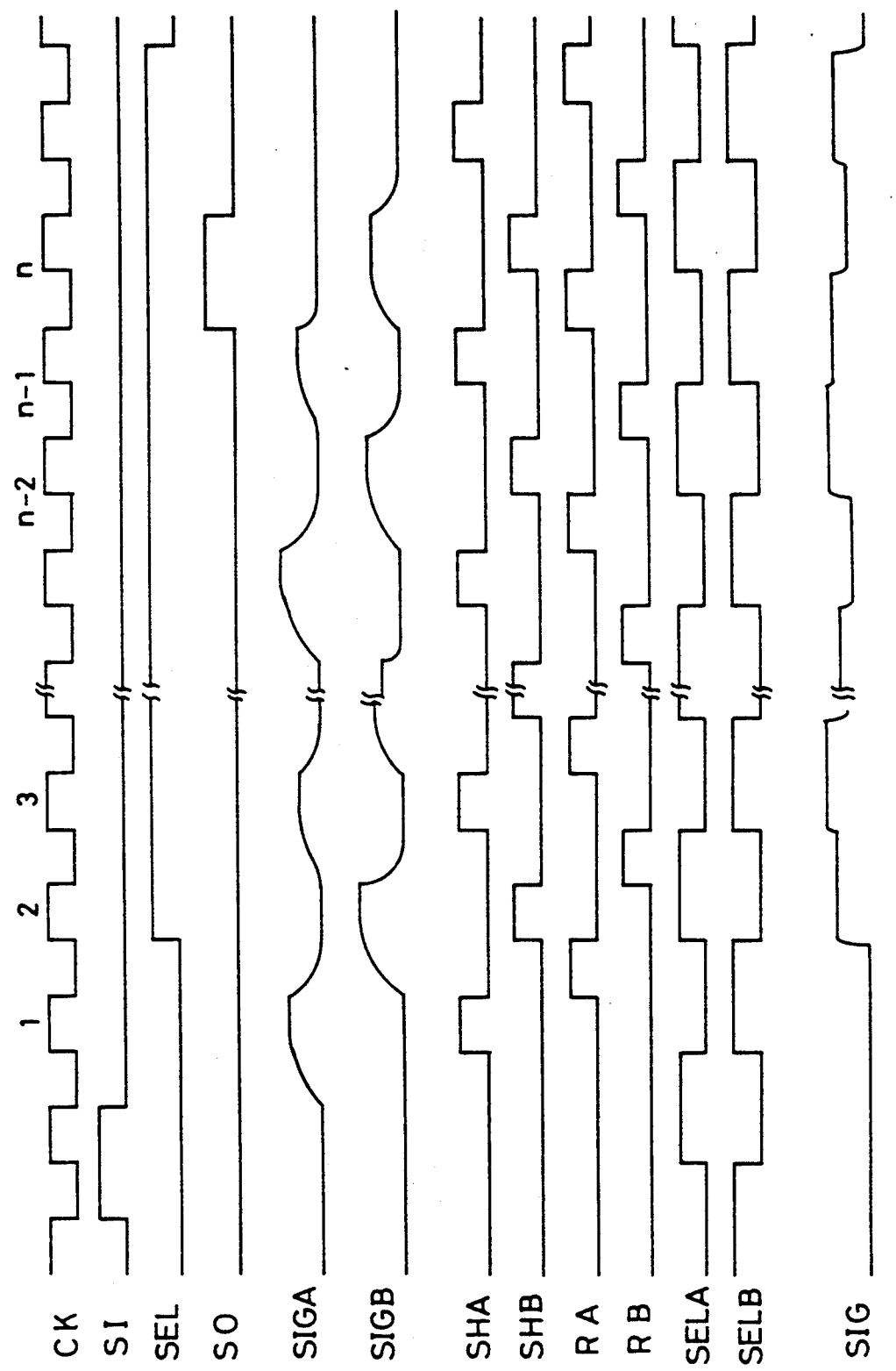
FIG. 2 is a timing chart showing the operation of the FIG. 1 image reading apparatus.
Figure 3:
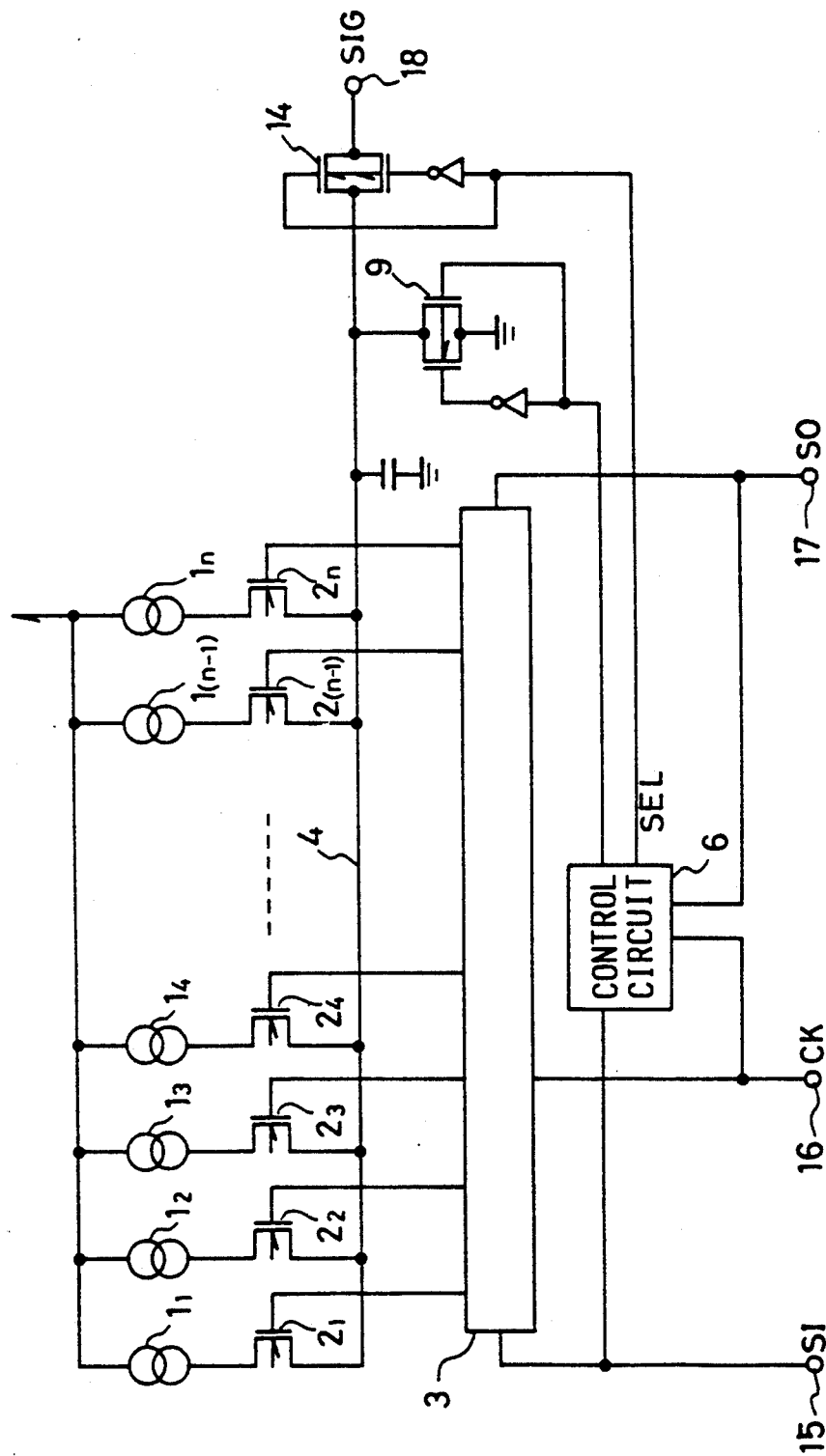
FIG. 3 is a block diagram showing the conventional image reading apparatus.

FIG. 2 is a timing chart showing the operation of the image reading apparatus. The scanning circuit 3 operates in response to each trailing edge of the clock pulse signal CK. Namely, the i-th first switching element $2i$ ($i=1, 2, \ldots, n$) is turned on when the i-th clock pulse CK falls, which is counted from the input of the start signal SI to the scanning circuit 3. The corresponding i-th photoelectric conversion element $1i$ feeds an image signal SIGA to the common line 5 when the number i is odd, or feeds an image signal SIGB to the other common line 4 when the number i is even. Since there are provided a pair of common lines 4 and 5 which are alternately selected one after the another, the individual photoelectric conversion elements $1i$ can output their image signals during one entire period of each clock pulse CK.

Figure 4:
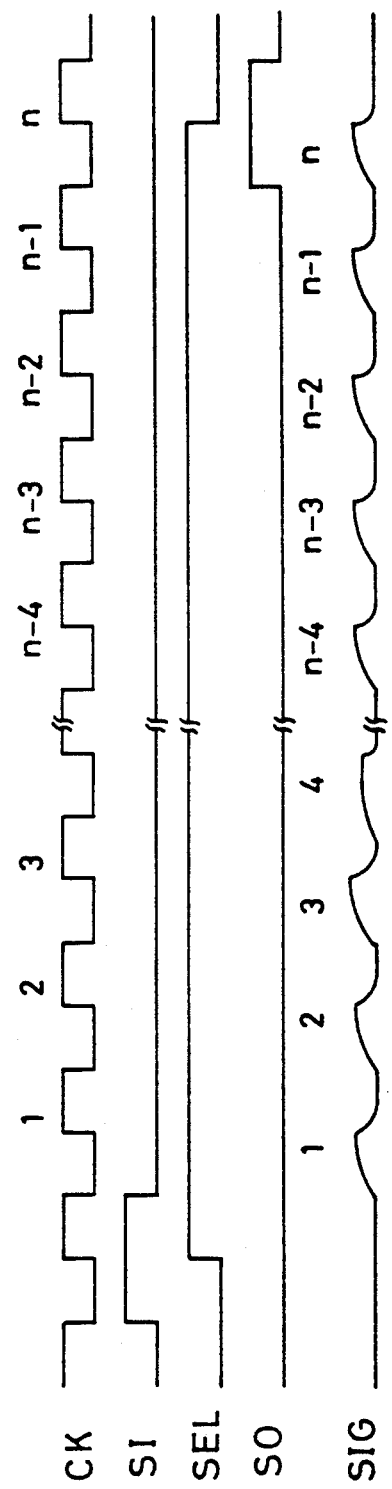
FIG. 4 is a timing chart showing the operation of the FIG. 3 image reading apparatus.

In contrast, in the conventional apparatus shown in FIG. 4, the image signal is outputted during a half of one clock pulse period. Accordingly, in each present embodiment, the photoelectric conversion element $1i$ can output its image signal for a period twice as long as that in the prior art. While the image signal cannot rise perfectly in each output period due to the affect of the load capacitance, etc. in the prior art, according to the invention the image signal SIGA or SIGB can rise completely during each output period when the image signal is fed to the common line 4 or 5. The pair of sample hold circuits 7 and 8 and the pair of third switching elements 11 and 12 cooperate together to alternately select the image signal form the common lines 4 and 5 so that the selected image signal can be outputted externally through a single output terminal 18. The image signal output terminal 18 outputs the image signal SIG which is retrieved sequentially from the photoelectric conversion elements $1_1-1_n$ in the form of a held or latched wave shape which can be directly inputted into an external A/D converter.

In the FIG. 1 embodiment, the first switching elements $2_1-2_n$ are comprised of NMOS transisters for simplification, but may be otherwise comprised of CMOS transistors. Further, the second switching elements 9 and 10, the third switching elements 11 and 12, and the fourth switching element 14 are comprised of CMOS transistors in this embodiment; however they may be otherwise comprised of NMOS transistors. Moreover, the scanning circuit is driven in response to each trailing edge of the clock pulses CK; however, it may be driven in response to each leading edge of the clock pulses CK. In such case, other circuit components are also altered accordingly.

According to the invention, the photoelectric conversion elements are alternately connected to a pair of separate common lines, and the respective common lines are connected through corresponding sample hold circuits to a single output terminal so as to output therefrom an image signal, thereby prolonging the output duration of the image signal on bit-by-bit basis to realize fast driving of the apparatus and to improve the S/N ratio.

What is claimed is:

1. An image reading apparatus comprising: a plurality of photoelectric conversion elements arranged linearly and integrally with respect to one another; a plurality of first switching elements connected at their one terminals to corresponding photoelectric conversion elements and connected at their other terminals alternately every other one to a pair of separate common lines; a scanning circuit responsive to a scanning start signal for sequentially scanning the first switching elements and outputting a scanning end signal after completion of the scanning; a pair of second switching elements connected between the respective common lines and a ground line; a pair of sample hold circuits having input terminals connected to the respective common lines and output terminals; a pair of third switching elements having one terminals connected to the respective output terminals of the sample hold circuits and other terminals; an output terminal commonly connected to the other terminals of the third switching elements; and a control circuit operative according tot he scanning start signal and the scanning end signal for controlling the second and third switching elements and the pair of sample hold circuits.

2. An image reading apparatus, comprising: a plurality of photoelectric converting means for converting optical image information into electrical image signals; first and second common lines; means for sequentially scanning the plural photoelectric converting means at a rate based on clock pulses having a given period to sequentially read out the electrical image signals from the respective photoelectric converting means such that each image signal is read out during the entire period of its corresponding clock pulse and for applying the read out image signals alternately to the first and second common lines so that alternate ones of the signals are applied to the first common line and the remaining alternate ones of the signals are applied to the second common line; first holding means for sequentially and temporarily holding the read out image signals applied to the first common line; second holding means for sequentially and temporarily holding the read out image signals applied to the second common line; and means for alternately switching between the first and second holding means to sequentially apply the image signals to a single image output terminal.

3. An image reading apparatus according to claim 2; wherein the first holding means has an input terminal connected to the first common line and an output terminal for outputting the image signals applied to the first common line; the second holding means has an input terminal connected to the second common line and an output terminal for outputting the image signals applied to the second common line; and the means for alternately switching comprises switching means for alternately and sequentially switching the output terminals of the first and second holding means to the image output terminal.

4. An image reading apparatus according to claim 3; wherein the means for sequentially scanning comprises plural switching elements each having an input terminal, output terminal and switching terminal, the input terminals of the plural switching elements being connected to respective ones of the plural photoelectric converting means, the output terminals of alternate ones of the switching elements being connected to the first common line and the output terminals of the remaining alternates ones of the switching elements being connected to the second common line, and a scanning circuit for sequentially scanning the switching terminals of the switching elements to sequentially read out the image signals from the plural photoelectric converting means.

5. An image reading apparatus according to claim 4; wherein the plural photoelectric converting means comprises a plurality of photoelectric conversion elements.

6. An image reading apparatus according to claim 5; wherein the plural photoelectric conversion elements are disposed linearly to define a line sensor.

7. An image reading apparatus according to claim 4; including control means for controlling the first and second holding means.

8. An image reading apparatus according to claim 2; wherein the means for sequentially scanning comprises plural switching elements each having an input terminal, output terminal and switching terminal, the input terminals of the plural switching elements being connected to respective ones of the plural photoelectric converting means, the output terminals of alternate ones of the switching elements being connected to the first common line and the output terminals of the remaining alternates ones of the switching elements being connected to the second common line, and a scanning circuit for sequentially scanning the switching terminals of the switching elements to sequentially read out the image signals from the plural photoelectric converting means.

9. An image reading apparatus according to claim 8; wherein the plural photoelectric converting means comprises a plurality of photoelectric conversion elements.

10. An image reading apparatus according to claim 2; including control means for controlling the first and second holding means.

* * * * *